United States Patent [19]
Mehmandoust et al.

[11] Patent Number: 5,851,601
[45] Date of Patent: Dec. 22, 1998

[54] METHOD FOR CONTROLLING LUBRICANT THICKNESS ON THIN FILM, MAGNETIC DISK MEDIA

[75] Inventors: Yassin Mehmandoust, Saratoga; Hamid R. Samani, San Jose; Atef H. Eltoukhy, Saratoga, all of Calif.

[73] Assignee: StorMedia, Inc., Santa Clara, Calif.

[21] Appl. No.: 921,297

[22] Filed: Aug. 29, 1997

Related U.S. Application Data

[60] Provisional application No. 60/025,363 Sep. 3, 1996.

[51] Int. Cl.$^6$ .................................................. B05D 3/00
[52] U.S. Cl. .......................... 427/561; 427/131; 427/600
[58] Field of Search .................................. 427/561, 600, 427/131

*Primary Examiner*—Bernard Pianalto
*Attorney, Agent, or Firm*—Lahive & Cockfield, LLP

[57] ABSTRACT

A method for controlling the application of lubricant to thin film, magnetic disk media entailing ultrasonic vibration of heated disk lubricant.

4 Claims, 1 Drawing Sheet

METHOD FOR CONTROLLING LUBRICANT THICKNESS ON THIN FILM, MAGNETIC DISK MEDIA

RELATED APPLICATION

This application claims the priority benefit of United States Provisional Application 60/025,363, filed Sep. 3, 1996, entitled "Method For Controlling Lubricant Thickness On Thin Film, Magnetic Disk Media" and identifying Mehmandoust et al as co-inventors.

GENERAL BACKGROUND OF THE INVENTION

This invention is directed to a concept for effectively controlling the application of the normally relatively small amounts of lubricant to thin film magnetic disk media.

Specifically, the invention relates to the use of a combination of ultrasonic vibration and heat to prevent a disk lubricant such as a cyclophosphazine from separating from solvent solution during lubricant application.

In addition, the invention contemplates the further utilization of composite solvents, particularly in connection with composite disk lubricants, to effectively control and enhance the amount of disk lubricant applied to disks at low lubricant concentrations.

GENERAL STATE OF THE PRIOR ART

Prior art such as the United States Chambers patent 1,992,938 broadly contemplates the use of high frequency vibration to stabilize formulations such as emulsion.

However, prior art of this nature does not in any way suggest the present inventive concept which is characterized by the use of ultrasonic vibration and heat to prevent separation of lubricants such as cyclophosphazine from solvents during magnetic media disk lubricant application.

GENERAL SUMMARY OF INVENTION

In a broad sense, the present invention contemplates:

A method of enhancing the application of lubricant to the outer surfaces of thin-film, magnetic disk media, this method comprising:
heating a solvent for dissolving a disk lubricant to above an ambient temperature;
dissolving a disk lubricant at an original lubricant concentration in the heated solvent;
ultrasonically vibrating the heated solvent containing the disk lubricant;
reducing the temperature of the heated and ultrasonically vibrated solvent containing the dissolved disk lubricant to approximately ambient temperature, with
the disk lubricant remaining dissolved in the solvent and substantially free of separation therefrom, and
the disk lubricant remaining dissolved in the solvent at at least the original concentration level; and
applying the reduced temperature solvent containing the dissolved disk lubricant to an outer surface of a magnetic disk media with
the concentration of the disk lubricant in the solvent remaining substantially at at least the original concentration, with
this heating and ultrasonic vibration of the solvent cooperating to
prevent separation of dissolved disk lubricant from the solvent, and
thereby permit relatively high amounts of the lubricant to be applied to the disk media.

In a more specific sense, in relation to specific solvent and lubricant materials presently preferred in the practice of the invention, this invention relates to a method concept as follows:

A method of enhancing the application of lubricant to the outer surfaces of thin-film, magnetic disk media, this method comprising:
heating a perfluorohexane solvent for dissolving a disk lubricant to above an ambient temperature to at least about 30° C.;
dissolving a disk lubricant, comprising a cyclophosphazine material, at an original lubricant concentration in the heated solvent;
ultrasonically vibrating the heated perfluorohexane solvent containing the cyclophosphazine;
reducing the temperature of the heated and ultrasonically vibrated solvent containing said dissolved disk lubricant to approximately ambient temperature, with
the cyclophosphazine remaining dissolved in the perfluorohexane solvent and substantially free of separation therefrom, and
the cyclophosphazine remaining dissolved in the perfluorohexane solvent at at least the original concentration level; and
applying the reduced temperature solvent containing the dissolved disk lubricant to an outer surface of a magnetic disk media with
the concentration of the cyclophosphazine in the perfluorohexane solvent remaining substantially at at least the original concentration, with
the heating and ultrasonic vibration of the perfluorohexane solvent cooperating to
prevent separation of dissolved cyclophosphazine from the perfluorohexane solvent, and
thereby permit relatively high amounts of the cyclophosphazine to be applied to the disk media.

Thickness control of disk lubricant, in the context of the basic invention noted above, is efficaciously achieved by the relative amounts of the constituents of composite solvents which are employed in the application of disk lubricant.

One such thickness control concept may be characterized as follows:

A method of enhancing the application of lubricant to the outer surfaces of thin-film, magnetic disk media, this method comprising:
heating a composite solvent, comprising a perfluorohexane solvent and a fluoropentane solvent, for dissolving a disk lubricant to above an ambient temperature to at least about 30° C.;
dissolving a composite disk lubricant, comprising a mixture of a cyclophosphazine material and perfluoropolyether, at an original lubricant concentration in the heated composite solvent;
ultrasonically vibrating the heated composite solvent containing the composite disk lubricant;
reducing the temperature of the heated and ultrasonically vibrated composite solvent containing said dissolved, composite disk lubricant to approximately ambient temperature, with
the composite disk lubricant remaining dissolved in the composite solvent and substantially free of separation therefrom, and
the composite disk lubricant remaining dissolved in the composite solvent at at least the original concentration level;

applying the reduced temperature, composite solvent containing the dissolved, composite disc lubricant to an outer surface of a magnetic disk media with
the concentration of the composite disk lubricant in the composite solvent remaining substantially at at least the original concentration;
this heating and ultrasonic vibration of the composite solvent cooperating to
prevent separation of dissolved, composite lubricant from the composite solvent, and
thereby permit relatively high amounts of the composite lubricant to be applied to the disk media; and
controlling the amount of the composite lubricant applied to the disk media as a function of the relative amounts of perfluorohexane solvent and fluoropentane solvent in the composite solvent.

Another thickness control concept, involving a different composite solvent, entails the following concept:

A method of enhancing the application of lubricant to the outer surfaces of thin-film, magnetic disk media, the method comprising:
heating a composite solvent, comprising a perfluorohexane solvent and a hydrofluoroether solvent, for dissolving a disk lubricant to above an ambient temperature to at least about 30° C.;
dissolving a composite disk lubricant, comprising a mixture of a cyclophosphazine material and perfluoropolyether, at an original lubricant concentration in the heated composite solvent;
ultrasonically vibrating the heated composite solvent containing the composite disk lubricant;
reducing the temperature of the heated and ultrasonically vibrated composite solvent containing the dissolved, composite disk lubricant to approximately ambient temperature, with
the composite disk lubricant remaining dissolved in the composite solvent and substantially free of separation therefrom, and
the composite disk lubricant remaining dissolved in the composite solvent at at least the original concentration level;
applying the reduced temperature, composite solvent containing the dissolved, composite disk lubricant to an outer surface of a magnetic disk media with
the concentration of the composite disk lubricant in the composite solvent remaining substantially at at least the original concentration;
this heating and ultrasonic vibration of the composite solvent cooperating to
prevent separation of dissolved, composite lubricant from the composite solvent, and
thereby permit relatively high amounts of the composite lubricant to be applied to said disk media; and
controlling the amount of said composite lubricant applied to the disk media as a function of the relative amounts of perfluorohexane solvent and hydrofluoroether solvent in the composite solvent.

With the invention having been summarized, a detailed description of presently preferred embodiments will be presented, with appropriate reference being made to an accompanying drawing.

BRIEF DESCRIPTION OF THE DRAWING

In the drawing, the FIGURE depicts the manner in which relative amounts of the constituents of a composite solvent may be employed to regulate and control the amount of cyclophosphazine disk lubricant applied to magnetic disc media in the context of the present invention.

PRESENTLY PREFERRED EMBODIMENT

Figure 1:
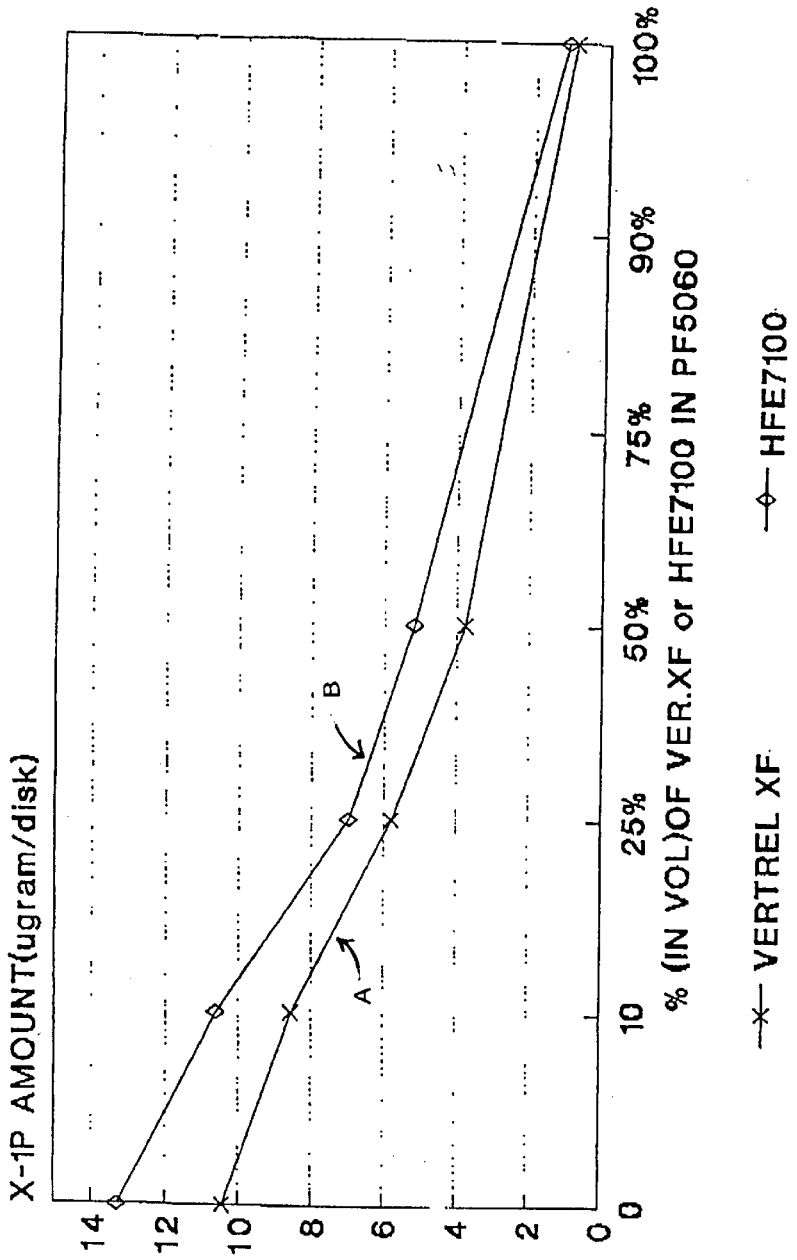

In describing the presently preferred embodiment, reference will first be made to a technical overview of the invention, following which the invention will be summarized with respect to separately significant aspects.

Technical Overview

Before commencing this discussion, and for the convenience of practitioner's in the art, the following table summarizes materials being referred to by trade or commercial names.

| Trade Name | Source | Composition |
|---|---|---|
| PF5060 | 3M | Perfluorohexane |
| X1P | Dow | Cyclophosphazene |
| Vertrel XF | Dupont | Fluoropentane |
| HFE 7100 | 3M | Hydrofluoroether |

Keeping the foregoing composition identifications in mind, the technical aspects of the invention may be briefly summarized as follows:

X1P dissolves completely in polar solvents such as Vertrel XF. One can use this solvent and apply X1P to the disk. The X1P thickness can controlled by X1P concentration in the solvent or the pull rate of the dip luber if one is using one for X1P application. But in nonpolar solvents such as PF5060 it does not dissolve well or dissolves poorly. One can increase the solubility of X1P in PF5060 by heating above an ambient temperature such as about 20° C. to at least about 30° C. However, upon cooling, the X1P separates when temperature drops back to room temperature. By using ultrasonic vibration and heat simultaneously the solubility increases more and separation does not take place when the temperature drops back to room temperature. Conventional solution heating and liquid body vibrating apparatus may be used for this purpose.

For same concentration of X1P in Vertrel XF and PF5060 one can get as much as 18 times more X1P on the disks using X1P with PF5060.

In low concentration regimes the X1P amount on the disk is independent of X1P concentration. We have found a new way to control this thickness by mixing PF5060 and Vertrel XF in proper ratios to get the desired thickness. The control of X1P thickness is important so as to enhance disk performance. This concept also applies to a composite solvent comprising PF5060 and HFE7100.

As is shown in the FIGURE, the amount of deposited cyclophosphazine lubricant applied to a magnetic disk can be effectively regulated in accordance with the volume percentage of the solvent combined with the PF5060 solvent.

Curve A of the FIGURE illustrates the variation in disk applied cyclophosphazine amount ranging on the left of curve A where 0 percent by volume of Vertrel XF (100% PF5060) is employed to the right of curve A where 100 percent of Vertrel (no PF5060) is employed.

Similarly, curve B depicts thickness control achieved with a combination of HFE7100 and PF5060. The right portion of curve B depicts 100 percent by volume of HFE7100 while the left portion of curve B depicts 100 percent of PF5060 being employed. The variations in amounts of X1P applied to a disk are depicted along this curve as the depicted amount of HFE7100 ranges from 0% to 100%.

In curve A it is contemplated that the X1P volume concentration solvent would be approximately 0.04 grams of X1P per liter of composite solvent while in connection with curve B the X1P concentration would also be approximately 0.04 grams of X1P per liter of composite solvent.

It is to be further recognized that this invention may be practiced using a composite lubricant such as X1P in combination with PFPE (perfluoropolyether) in the manner generally described in pending U.S. application Ser. No. 08/673,290,abandoned of Vurens et al, filed Jun. 28, 1996 and assigned to the assignee of this present application. The disclosure of this application Ser. No. 08/673,290 abandoned is herein incorporated by reference.

Summary Of Inventive Aspects

In a broad sense, the basic method invention herein presented is characterized as follows:

A method of enhancing the application of lubricant to the outer surfaces of thin-film, magnetic disk media is presented which entails:
heating a solvent for dissolving a disk lubricant to above an ambient temperature;
dissolving a disk lubricant at an original lubricant concentration in the heated solvent;
ultrasonically vibrating the heated solvent containing the disk lubricant;
reducing the temperature of the heated and ultrasonically vibrated solvent containing the dissolved disk lubricant to approximately ambient temperature, with
the disk lubricant remaining dissolved in the solvent and substantially free of separation therefrom, and
the disk lubricant remaining dissolved in the solvent at at least the original concentration level; and
applying the reduced temperature solvent containing the dissolved disk lubricant to an outer surface of a magnetic disk media with
the concentration of the disk lubricant in the solvent remaining substantially at at least the original concentration;
this heating and ultrasonic vibration of said solvent cooperating to
prevent separation of dissolved disk lubricant from the solvent, and
thereby permit relatively high amounts of the lubricant to be applied to the disk media.

With respect to presently preferred lubricant and solvent constituents, the invention is characterized by a method entailing the following steps:
heating a perfluorohexane solvent for dissolving a disk lubricant to above an ambient temperature to at least about 30° C.;
dissolving a disk lubricant, comprising a cyclophosphazine material, at an original lubricant concentration in the heated solvent;
ultrasonically vibrating the heated perfluorohexane solvent containing the cyclophosphazine;
reducing the temperature of the heated and ultrasonically vibrated solvent containing the dissolved disk lubricant to approximately ambient temperature, with
the cyclophosphazine remaining dissolved in the perfluorohexane solvent and substantially free of separation therefrom, and
the cyclophosphazine remaining dissolved in the perfluorohexane solvent at at least the original concentration level; and
applying the reduced temperature solvent containing the dissolved disk lubricant to an outer surface of a magnetic disk media with
the concentration of the cyclophosphazine in the perfluorohexane solvent remaining substantially at at least the original concentration;
this heating and ultrasonic vibration of the perfluorohexane solvent cooperating to
prevent separation of dissolved cyclophosphazine from the perfluorohexane solvent, and
thereby permit relatively high amounts of the cyclophosphazine to be applied to said disk media.

With respect to specific composite solvent and lubricant formulations, where the relative percentages of solvent constituents on a volume basis are operable to determine effective amount of applied lubricant, the invention is characterized by the following method steps.

With respect to one composite formulation concept, these steps involve:
heating a composite solvent, comprising a perfluorohexane solvent and a fluoropentane solvent, for dissolving a disk lubricant to above an ambient temperature to at least about 30° C.;
dissolving a composite disk lubricant, comprising a mixture of a cyclophosphazine material and perfluoropolyether, at an original lubricant concentration in the heated composite solvent;
ultrasonically vibrating the heated composite solvent containing the composite disk lubricant;
reducing the temperature of the heated and ultrasonically vibrated composite solvent containing the dissolved, composite disk lubricant to approximately the ambient temperature, with
the composite disk lubricant remaining dissolved in the composite solvent and substantially free of separation therefrom, and
the composite disk lubricant remaining dissolved in said composite solvent at at least the original concentration level;
applying the reduced temperature, composite solvent containing the dissolved, composite disc lubricant to an outer surface of a magnetic disk media with
the concentration of the composite disk lubricant in the composite solvent remaining substantially at at least the original concentration;
this heating and ultrasonic vibration of the composite solvent cooperating to
prevent separation of dissolved, composite lubricant from the composite solvent, and
thereby permit relatively high amounts of the composite lubricant to be applied to the disk media; and
controlling the amount of the composite lubricant applied to the disk media as a function of the relative amounts of perfluorohexane solvent and fluoropentane solvent in the composite solvent.

In relation to yet another composite solvent concept, a method is presented entailing the following steps:
heating a composite solvent, comprising a perfluorohexane solvent and a hydrofluoroether solvent, for dissolving a disk lubricant to above an ambient temperature to at least about 30° C.;
dissolving a composite disk lubricant, comprising a mixture of a cyclophosphazine material and perfluoropolyether, at an original lubricant concentration in the heated composite solvent;

ultrasonically vibrating the heated composite solvent containing the composite disk lubricant;

reducing the temperature of the heated and ultrasonically vibrated composite solvent containing the dissolved, composite disk lubricant to approximately ambient temperature, with the composite disk lubricant remaining dissolved in the composite solvent and substantially free of separation therefrom, and the composite disk lubricant remaining dissolved in the composite solvent at at least its original concentration level;

applying the reduced temperature, composite solvent containing the dissolved, composite disk lubricant to an outer surface of a magnetic disk media with the concentration of the composite disk lubricant in the composite solvent remaining substantially at at least its original concentration;

this heating and ultrasonic vibration of the composite solvent cooperating to prevent separation of dissolved, composite lubricant from the composite solvent, and thereby permit relatively high amounts of the composite lubricant to be applied to the disk media; and controlling the amount of the composite lubricant applied to the disk media as a function of the relative amounts of perfluorohexane solvent and hydrofluoroether solvent in the composite solvent.

SUMMARY OF OVERALL ADVANTAGES AND SCOPE OF INVENTION

The present invention provides a uniquely effective manner for employing lubricants such as PF5060, i.e., nonpolar solvents, for efficiently applying a difficult to dissolve lubricant such as a cyclophosphazine materials to thin film disk media.

The combination of ultrasonic vibration and heat enables the solvent containing the disk lubricant to be heated and then cooled without causing the lubricant to separate from the solvent solution, thereby ensuring the proper application of lubricant to the disk.

By appropriately controlling the ratios of composite ingredient solvents, the amount of deposited lubricant may be effectively controlled.

Those skilled in the art and familiar with this disclosure may recognize additions, deletions, substitutions, and other modifications which would fall within the purview of the invention as set forth in the appended claims.

What is claimed is:

1. A method of enhancing the application of lubricant to the outer surfaces of thin-film, magnetic disk media, said method comprising:

heating a solvent for dissolving a disk lubricant to above an ambient temperature;

dissolving a disk lubricant at an original lubricant concentration in said heated solvent;

ultrasonically vibrating said heated solvent containing said disk lubricant;

reducing the temperature of said heated and ultrasonically vibrated solvent containing said dissolved disk lubricant to approximately said ambient temperature, with said disk lubricant remaining dissolved in said solvent and substantially free of separation therefrom, and said disk lubricant remaining dissolved in said solvent at at least said original concentration level; and applying said reduced temperature solvent containing said dissolved disk lubricant to an outer surface of a magnetic disk media with the concentration of said disk lubricant in said solvent remaining substantially at at least said original concentration;

said heating and ultrasonic vibration of said solvent cooperating to prevent separation of dissolved disk lubricant from said solvent, and thereby permit relatively high amounts of said lubricant to be applied to said disk media.

2. A method of enhancing the application of lubricant to the outer surfaces of thin-film, magnetic disk media, said method comprising:

heating a perfluorohexane solvent for dissolving a disk lubricant to above an ambient temperature to at least about 30° C.;

dissolving a disk lubricant, comprising a cyclophosphazine material, at an original lubricant concentration in said heated solvent;

ultrasonically vibrating said heated perfluorohexane solvent containing said cyclophosphazine;

reducing the temperature of said heated and ultrasonically vibrated solvent containing said dissolved disk lubricant to approximately said ambient temperature, with said cyclophosphazine remaining dissolved in said perfluorohexane solvent and substantially free of separation therefrom, and said cyclophosphazine remaining dissolved in said perfluorohexane solvent at at least said original concentration level; and applying said reduced temperature solvent containing said dissolved disk lubricant to an outer surface of a magnetic disk media with the concentration of said cyclophosphazine in said perfluorohexane solvent remaining substantially at at least said original concentration;

said heating and ultrasonic vibration of said perfluorohexane solvent cooperating to prevent separation of dissolved cyclophosphazine from said perfluorohexane solvent, and thereby permit relatively high amounts of said cyclophosphazine to be applied to said disk media.

3. A method of enhancing the application of lubricant to the outer surfaces of thin-film, magnetic disk media, said method comprising:

heating a composite solvent, comprising a perfluorohexane solvent and a fluoropentane solvent, for dissolving a disk lubricant to above an ambient temperature to at least about 30° C.;

dissolving a composite disk lubricant, comprising a mixture of a cyclophosphazine material and perfluoropolyether, at an original lubricant concentration in said heated composite solvent;

ultrasonically vibrating said heated composite solvent containing said composite disk lubricant;

reducing the temperature of said heated and ultrasonically vibrated composite solvent containing said dissolved, composite disk lubricant to approximately said ambient temperature, with said composite disk lubricant remaining dissolved in said composite solvent and substantially free of separation therefrom, and said composite disk lubricant remaining dissolved in said composite solvent at at least said original concentration level;

applying said reduced temperature, composite solvent containing said dissolved, composite disc lubricant to an outer surface of a magnetic disk media with
  the concentration of said composite disk lubricant in said composite solvent remaining substantially at at least said original concentration;
said heating and ultrasonic vibration of said composite solvent cooperating to
  prevent separation of dissolved, composite lubricant from said composite solvent, and
  thereby permit relatively high amounts of said composite lubricant to be applied to said disk media; and
controlling the amount of said composite lubricant applied to said disk media as a function of the relative amounts of perfluorohexane solvent and fluoropentane solvent in said composite solvent.

4. A method of enhancing the application of lubricant to the outer surfaces of thin-film, magnetic disk media, said method comprising:

heating a composite solvent, comprising a perfluorohexane solvent and a hydrofluoroether solvent, for dissolving a disk lubricant to above an ambient temperature to at least about 30° C.;

dissolving a composite disk lubricant, comprising a mixture of a cyclophosphazine material and perfluoropolyether, at an original lubricant concentration in said heated composite solvent;

ultrasonically vibrating said heated composite solvent containing said composite disk lubricant;

reducing the temperature of said heated and ultrasonically vibrated composite solvent containing said dissolved, composite disk lubricant to approximately said ambient temperature, with
  said composite disk lubricant remaining dissolved in said composite solvent and substantially free of separation therefrom, and
  said composite disk lubricant remaining dissolved in said composite solvent at at least said original concentration level;
applying said reduced temperature, composite solvent containing said dissolved, composite disk lubricant to an outer surface of a magnetic disk media with
  the concentration of said composite disk lubricant in said composite solvent remaining substantially at at least said original concentration;
said heating and ultrasonic vibration of said composite solvent cooperating to
  prevent separation of dissolved, composite lubricant from said composite solvent, and
  thereby permit relatively high amounts of said composite lubricant to be applied to said disk media; and
controlling the amount of said composite lubricant applied to said disk media as a function of the relative amounts of perfluorohexane solvent and hydrofluoroether solvent in said composite solvent.

* * * * *